United States Patent [19]

Gleine

[11] Patent Number: 5,023,446

[45] Date of Patent: Jun. 11, 1991

[54] APPARATUS FOR MEASURING DISTANCES WITH A MEASURING ELEMENT OPERATING ON AN OPTICAL BASIS

[75] Inventor: Wolfgang Gleine, Stade/Hagen, Fed. Rep. of Germany

[73] Assignee: Messerschmitt-Boelkow-Blohm GmbH, Munich, Fed. Rep. of Germany

[21] Appl. No.: 479,381

[22] Filed: Feb. 12, 1990

[30] Foreign Application Priority Data

Feb. 10, 1989 [DE] Fed. Rep. of Germany ....... 3903881

[51] Int. Cl.$^5$ .......................... H01J 5/16; G01L 1/24
[52] U.S. Cl. .................................. 250/227.16; 73/800
[58] Field of Search .................... 250/227.14, 227.16; 73/800; 356/358

[56] References Cited

U.S. PATENT DOCUMENTS 4,070,118 1/1978 Maslowski et al. ................. 356/237
4,443,698 4/1984 Schiffner ........................ 250/227.14
4,482,890 11/1990 Forbes et al. .................. 250/227.16

FOREIGN PATENT DOCUMENTS 3541733 11/1986 Fed. Rep. of Germany ..

Primary Examiner—David C. Nelms
Assistant Examiner—LaCharles P. Keesee
Attorney, Agent, or Firm—W. G. Fasse; D. H. Kane, Jr.

[57] ABSTRACT

Distances are measured by a measuring element operating on an optical basis by sensing light reflections caused by the bending in unison of at least two parallel light conductors. The measuring element has two parallel photoconductors of different lengths extending from a sensor inlet of a carrier, e.g., in the form of a sheath. The effective length of each conductor is determined by a respective mirror at the effective conductor end. Through the introduction of light into the shorter photoconductor and by the bending of the light conductors, light is coupled over to the second photoconductor. The extent of bending is measured by ascertaining the intensity and travel time of the reflections from both conductors. A reflection only from the shorter light conductor indicates that there is no bending or deflection of the two light conductors and hence no distance is being measured.

5 Claims, 2 Drawing Sheets

APPARATUS FOR MEASURING DISTANCES WITH A MEASURING ELEMENT OPERATING ON AN OPTICAL BASIS

FIELD OF THE INVENTION

The invention relates to an apparatus for measuring distances with a measuring element operating on an optical basis.

BACKGROUND INFORMATION

Optically operating measuring devices are generally known. For example, German Patent Publication (DE-PS) No. 3,541,733 discloses an apparatus equipped with two optical resonators for measuring pressure. The optical resonators form the measuring element which is coupled to a laser light source and to an evaluating circuit. The optical resonators are formed by radiant index/light-wave conductor sections, arranged on the upper and lower sides of an elastic sensor body which is deformable by compression. A counteracting detuning of the resonators is produced by the application of compression to the sensor body, whereby the detuning is the measure of the applied pressure. However, such device is not suitable for measuring distances, since the attainable deflections do not yield an adequate range of measurement. The known pressure sensor operates as a Fabry-Perot device.

OBJECTS OF THE INVENTION

In view of the above it is the aim of the invention to achieve the following objects singly or in combination:

to construct an apparatus for measuring distance having a measuring element operating on an optical basis and having a sufficient measuring range, e.g. up to about 20% of the length of said measuring element.

to use at least two light conductors in such a way that a transcoupled light constitutes a measure of the distance to be measured; and to evaluate the bending of light conductors as a measure for the distance to be measured.

SUMMARY OF THE INVENTION

The above objects have been achieved by a measuring device comprising, according to the invention, at least two photoconductors of different effective lengths extending parallel to each other from a sensory inlet of a carrier, wherein mirrors determine the effective length of each conductor, light is supplied into the shorter photoconductor and both photoconductors are deflected in unison, for example, by a deflection of the carrier which supports both photoconductors. Due to the deflection the light or photoconductors are bent, whereby light is coupled over from the shorter conductor into the longer photoconductor and reflected by the mirrored ends so that both conductors produce a respective reflected output signal. The relationship of the two output signals to each other is a measure of the extent of the deflection or bending.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
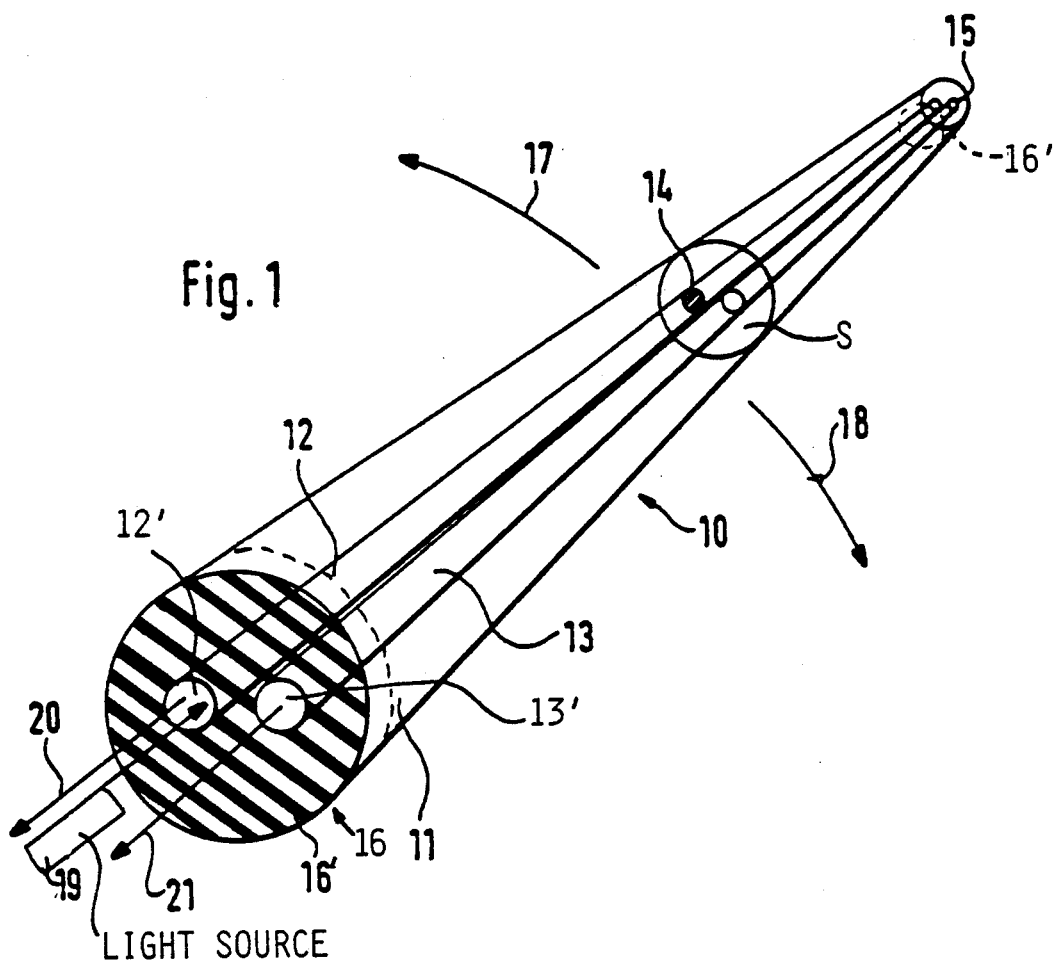
FIG. 1 is a distance measuring element with two parallel light-wave conductors having different effective lengths.

As depicted in FIG. 1, the principle components of a measuring or sensor element 10 are the wave conductors or photoconductors 12, 13 arranged within a carrier, such as a sheath 11. The conductor 12 is shorter than conductor 13, not necessarily physically, but in its effective length which is determined by the mirrored ends 14, 15 of the wave conductors 12, 13. The mirrored ends 14, 15 lie normally opposite the sensor inlet 16.

Figure 2:
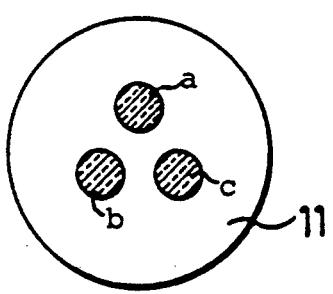
FIG. 2 shows a cross-section of a measuring element having three parallel light conductors each having different effective lengths.
Figure 3:
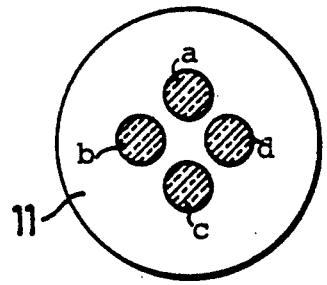
FIG. 3 shows a cross-section of another measuring element with four parallel light conductors of different effective lengths.

As seen in FIGS. 2 and 3, it is also possible to arrange three or four wave or photoconductors within a carrier member 11. Although not seen in FIGS. 2 and 3, each of the light conductors a, b, c, and d has a different effective length for a better sensitivity.

The light conductors 12 and 13 in FIG. 1 of the measuring element 10 are secured at both ends against lateral displacements, but the central section is displaceable or bendable in the direction of the arrows 17, 18. The conductor ends at the sensor inlet 16 and at the opposite end 15 are held in place, for example, by a synthetic embedding material 16' inside the carrier sheath 11 which is flexible to be bent. A support S makes sure that the photoconductors 12, 13 extend in parallel to each other. When pulsating light is radiated or introduced into the shorter wave conductor 12 from a suitable light source 19, in the absence of any deflection 17, 18 of the conductors 12, 13, the light is reflected substantially completely by the mirrored end 14 of the conductor 12. The reflected light is detected and measured at 12' by an optical sensor including a time multiplying device symbolically shown by the arrow 20. In the absence of a deflection or bending 17, 18 all of the light is reflected and the time-multiplexing device 20 indicates that no deflection occurred. A deflection or bending 17, 18 may be caused, for example, by the excursion of a mechanical sensor connected to the support S and contacting a point to be monitored. Such a point may for example be a point on the surface of a drive shaft, the bending or flexing of which is to be monitored. If a deflection or bending of the conductors 12, 13 occurs, then a specific amount of the light entering the conductor 12 is coupled over into the photo- or light conductor 13 and conducted to the sensor inlet 16 and to the mirrored end 15. The light impulses that are coupled into the sensor inlet of the wave conductor 12 are coupled over into the other light conductor or conductors in accordance with the extent of the bending of these light conductors, so that the coupled over light in the conductor 13 is a direct measure of the extent of the bending. Hence, the respective reflection is directly proportional to the extent of the bending. An optical sensor and evaluation device represented by the arrow 21 detects the reflected light at the output 13' and measures or determines the light intensity and travel time relative to the light at the end 12' in order to determine the deflection or bending distance. The arrows 20, 21 represent a conventional time multiplex evaluating unit, for example, known from U.S. Pat. No. 4,070,118.

Figure 4:
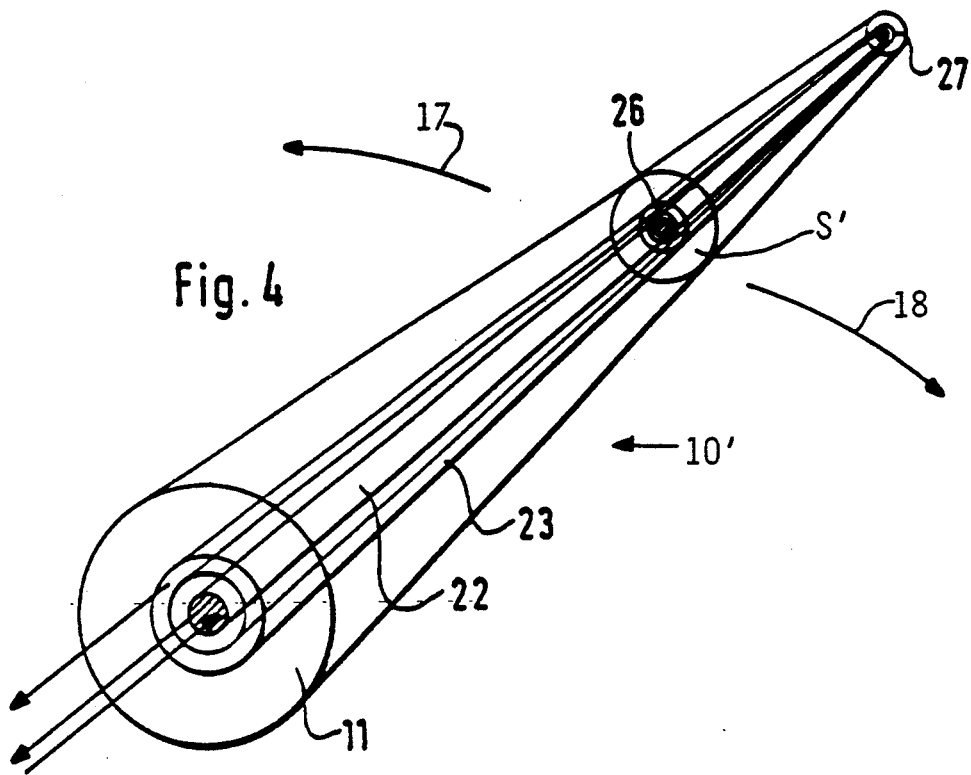
FIG. 4 is a measuring element with a core light conductor arranged in parallel to and concentrically in a tubular light conductor having a different effective length.
Figure 5:
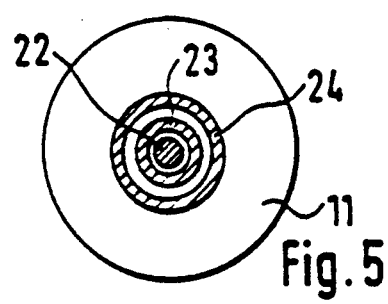
FIG. 5 shows a cross-section of a measuring element with a concentric arrangement of three light conductors.
Figure 6:
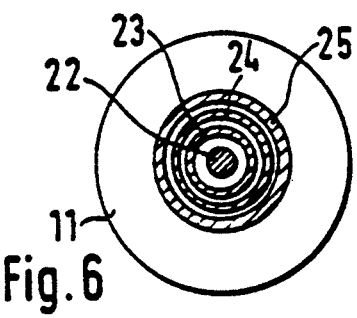
FIG. 6 shows a further cross-section of a measuring element having four concentrically arranged light conductors.

As depicted in FIGS. 4, 5, and 6, it is also possible to construct a measuring element 10' with a core conductor 22 and coaxially arranged tubular conductors 23, 24, and 25. These conductors still extend in parallel to each other and are supported at their ends in the sheath 11 as described. A support S' holds the conductors in parallel. The core conductor 22 is shorter in its effective length than the coaxial tubular conductors 23, 24, 25 and the effective conductor ends 26, 27 are mirrored. There is no difference between the function of a measuring element with coaxial light conductors and the function of the element shown in FIGS. 1, 2, and 3. The measured intensities also depend on the deflection or bending 17, 18 and are reciprocal relative to each other, that is, an intensity decrease in one channel or conductor causes an intensity increase in another channel or conductor as a function of the bending. A uniform decrease in the intensity that is reflected back, due to a change in temperature, for example, has no effect on the outcome of the measurement when the intensity ratio is formed.

A measuring element with a core conductor and one or more tubular conductors further has an advantage in that the coupling to a normal fiber photoconductor becomes easier. However, such coaxial conductors must be developed with special consideration for their coupling sensitivity. Metallizing or sputter technologies can be used to mirror the ends of the photoconductors. Etching technology can be used as well for this purpose. The present sensitive measuring element can be constructed so that an absolute measurement, rather than relative measurements, is possible, whereby temporary system failures do not cause any adverse effects.

Figure 7:
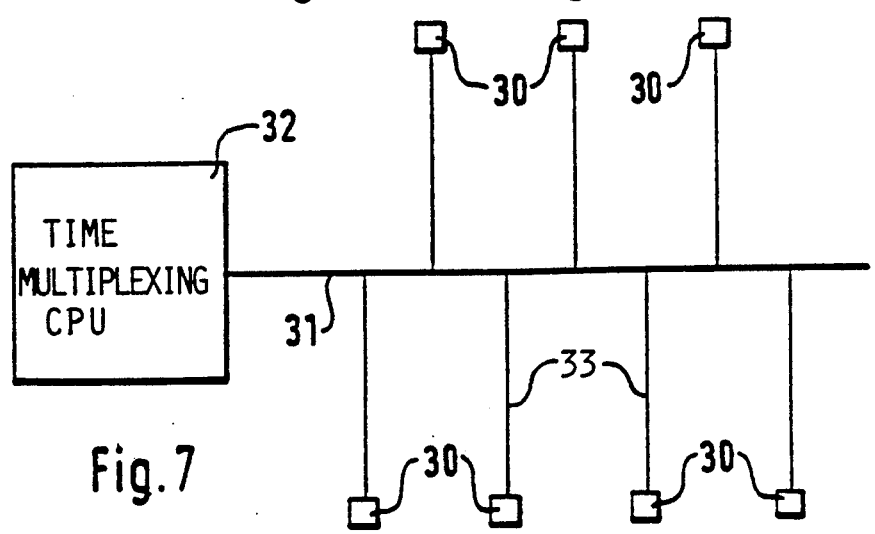
FIG. 7 is a block diagram of an arrangement for evaluating the output signals of a plurality of measuring elements.

As depicted in the block diagram of FIG. 7, it is possible to equip each of many sensors 30 with a measuring element 10, 10' and to connect the sensors 30 through individual light conductors 33 and an optical data bus 31 to an optical time multiplexing device 32 which also functions as a central processing unit having light input sensor means and a computer for the signal evaluation. The physical location of the sensors 30 is characterized by the chronological position of the measured light reflections. The data bus 31 has the advantage of a closed optical light path free of external influences, whereby humidity, freezing over, and contaminations do not have any adverse effects on the measurements.

Using more than two light conductors has the advantage of increasing the precision of the measurement since averaging of the measured values is possible. The measurable distance range will depend on the light conductor length and diameter, and on the spacing between the light conductors. This range will also depend on the refraction index of the material of which the light conductors are made and on the wave-length of the light used.

The present sensor device can, for example, measure deflections of a rotating shaft, e.g. a crankshaft, whereby a plurality of such devices may be arranged along the length of the shaft and interconnected as shown in FIG. 7. The time-multiplexing CPU 32 may be of the conventional type mentioned above.

Although the invention has been described with reference to specific example embodiments, it will be appreciated, that it is intended to cover all modifications and equivalents within the scope of the appended claims.

What I claim is:

1. An apparatus for measuring distance, comprising at least two parallel light conductors, support means for holding said at least two light conductors in a fixed parallel position relative to each other, said support means permitting a bending or deflection of said two light conductors in unison for coupling of light from one light conductor into the other light conductor as a function of said bending or deflection, a reflecting mirror at an effective first end of each light conductor so that each light conductor has a different optically effective length, whereby one conductor is shorter than the other, source means for introducing light into said shorter light conductor at a second end opposite said first reflecting end, light sensor means positioned to receive reflected light from each light conductor at said second end for providing respective light signals representing a measure of said bending or deflection of said light conductors, said measure in turn corresponding to the distance to be measured, and wherein a reflection only from said shorter light conductor indicates that no deflection or bending is taking place.

2. The apparatus of claim 1, wherein said light conductors comprise more than two light conductors arranged in parallel to each other for an improved sensitivity and precision.

3. The apparatus of claim 1, wherein said light conductors comprise a central core light conductor and at least one tubular light conductor arranged concentrically to said core light conductor, said core light conductor being shorter than said tubular light conductor.

4. The apparatus of claim 1, further comprising optical time multiplexing means including said light source for introducing light into the shortest light conductor and said light sensor means for sensing reflected light from each of said light conductors, said time multiplexing means further including a central processing unit for evaluating received light signals with regard to the light intensity and different propagation times of said light signals.

5. The apparatus of claim 4, comprising a plurality of sensors each comprising said at least two light conductors, and optical data bus means connecting said sensors to said time multiplexing means.

* * * * *